Oct. 27, 1936.  W. E. SNYDER  2,059,153

TOGGLE BOLT

Filed April 10, 1936

Inventor
W. E. Snyder

By Clarence A. O'Brien and
Hyman Berman
Attorneys

Patented Oct. 27, 1936

2,059,153

UNITED STATES PATENT OFFICE 2,059,153

TOGGLE BOLT

Walter E. Snyder, Troy, N. Y.

Application April 10, 1936, Serial No. 73,751

1 Claim. (Cl. 85—3)

The present invention relates to new and useful improvements in bolts and has for its primary object to provide, in a manner as hereinafter set forth, a bolt including novel means for anchoring said bolt in a wall, partition or other structure.

Other objects of the invention are to provide an anchor bolt of the aforementioned character which will be comparatively simple in construction, strong, durable, highly efficient and reliable in use and which may be manufactured at low cost.

All of the foregoing and still further objects and advantages of the invention will become apparent from a study of the following specification, taken in connection with the accompanying drawing wherein like characters of reference designate corresponding parts throughout the several views, and wherein:—

Figure 1:
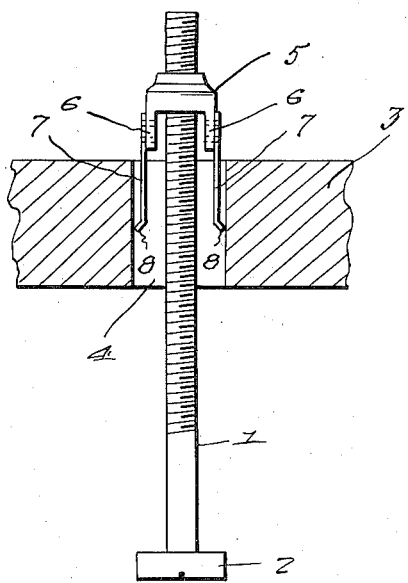
Figure 1 is a view of the invention, showing the same being inserted through an opening which has been prepared therefor in a wall or partition.

Referring now to the drawing in detail, it will be seen that the reference numeral 1 designates a threaded bolt having a slotted head 2 on one end for receiving a screw driver. The reference numeral 3 designates a partition or wall in which an opening 4 has been formed for the reception of the bolt 1.

Threadedly mounted on the bolt 1 is a nut 5 or the like from the inner end or face of which integral lugs 6 project. It will be noted that the lugs 6 parallel the bolt 1 on opposite sides thereof. Riveted to the lugs 6 are resilient, diverging anchoring legs 7 which terminate, at their free ends, in outturned feet 8.

Figure 2:
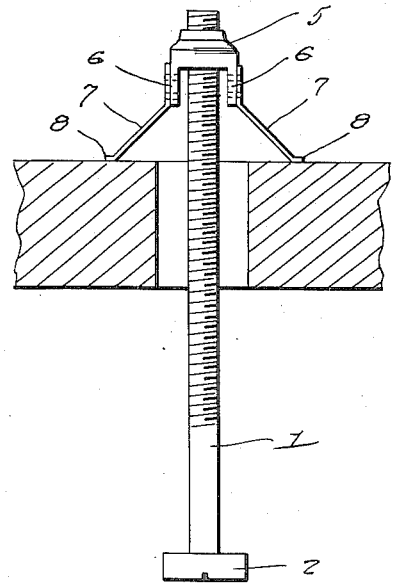
Figure 2 is a view, showing the invention after it has been inserted.
Figure 3:
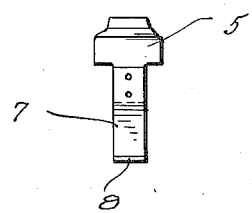
Figure 3 is a view in side elevation of the anchor.

It is thought that the operation of the invention will be readily apparent from a consideration of the foregoing. The bolt 1, with the nut 5 threaded thereon, is inserted through the opening 4 in the wall or partition 3, the resilient anchoring legs 7 being forced inwardly during this operation, as illustrated to advantage in Figure 1 of the drawing. However, as soon as the resilient legs 7 clear or pass the opening 4 in the wall or partition 3, said legs spring outwardly to the position best seen in Figure 2 of the drawing for engagement with the wall or partition 3 in a manner to prevent the bolt from being withdrawn. The projecting lugs 6 greatly facilitate riveting the resilient anchoring legs 7 to the nut 5 as it would obviously be a comparatively difficult operation to secure said legs directly to the body of said nut 5.

It is believed that the many advantages of an anchor bolt constructed in accordance with the present invention will be readily understood, and although a preferred embodiment of the device is as illustrated and described, it is to be understood that changes in the details of construction and in the combination and arrangement of parts may be resorted to which will fall within the scope of the invention as claimed.

What is claimed is:—

A device of the class described comprising a bolt including a slotted head on one end, a nut threadedly mounted on the other end portion of said bolt, integral lugs projecting from the inner end of the nut and paralleling the bolt on opposite sides thereof, and resilient, diverging anchoring legs rigidly secured to the lugs.

WALTER E. SNYDER.